(12) United States Patent
Zehner

(10) Patent No.: US 7,011,045 B1
(45) Date of Patent: Mar. 14, 2006

(54) PET RAMP

(76) Inventor: Jeffrey Zehner, 202 Rebeeca Sq., Pittsburgh, PA (US) 15209

( * ) Notice: Subject to any disclaimer, the term of this patent is extended or adjusted under 35 U.S.C. 154(b) by 0 days.

(21) Appl. No.: 10/851,027

(22) Filed: May 21, 2004

(51) Int. Cl.
  *E04H 4/14* (2006.01)
  *A01K 29/00* (2006.01)
(52) U.S. Cl. .................. 119/673; 119/847; 4/496
(58) Field of Classification Search ........... 119/485, 119/673, 847, 849; 4/496, 504; 182/83; 114/362
See application file for complete search history.

(56) References Cited

U.S. PATENT DOCUMENTS

| | | | | |
|---|---|---|---|---|
| 3,891,053 A | * | 6/1975 | Burton | 182/97 |
| 4,972,540 A | * | 11/1990 | Phelps | 14/75 |
| 5,333,323 A | * | 8/1994 | Aymes | 4/496 |
| 5,829,380 A | * | 11/1998 | Smith | 114/362 |
| 6,000,494 A | * | 12/1999 | Wilson | 182/93 |
| 6,311,343 B1 | * | 11/2001 | Wisniewski | 4/496 |

* cited by examiner

Primary Examiner—Robert P. Swiatek
(74) Attorney, Agent, or Firm—Richard K. Thomson

(57) ABSTRACT

A generally horizontal platform has connected to a first end thereof a sloping ramp that extends into the water of a swimming pool. The ramp is provided with traction enhancing ribs to enable a pet to extricate itself from a pool should it accidentally fall in or tire from swimming. In a first embodiment, adjustable legs sit on the bottom of the pool and support a first end of the ramp while the horizontal platform is secured to decking to prevent its horizontal and vertical movement relative to the upper edge of the pool. In a second embodiment, a second ramp is connected to the opposite end of the horizontal platform and legs support the second ramp on a ground portion external to the pool. In a third embodiment, the ramp is cantilevered over the pool and buoyancy within the submersed sloping ramp provides support.

6 Claims, 3 Drawing Sheets

PET RAMP

BACKGROUND AND SUMMARY OF THE INVENTION

The present invention is directed to the field of pet safety. More particularly, the present invention is directed to a ramp mountable on the side of a swimming pool to permit a pet to exit a pool when it has inadvertently fallen into a pool or when it tires of swimming and wishes to rest.

Pools provide fun for the entire family including the household pets. When a dog sees the rest of its "family" frolicking in the pool, it will naturally want to join in the fun. The dog will dive into the pool little realizing that, because the pool has no internal steps, the pool is a potential death trap for the pet.

While a number of attempts have been made to solve this problem, none have provided an entirely satisfactory solution. The present invention provides a pet ramp that adjusts to accommodate a variety of different size and types of pools and decking arrangements. A stationary ramp for permitting a pet to exit a filled swimming pool includes a generally horizontal platform overlying a portion of an edge of the swimming pool; a sloping ramp portion attached to said generally horizontal platform for extending down into the water in the swimming pool; traction means on said sloping ramp portion to enhance a pet's ability to walk on an upper surface of said sloping ramp portion; means in the water to support a first end of said sloping ramp portion; means to prevent said generally horizontal platform from moving vertically and horizontally relative to the edge portion of the swimming pool; whereby a pet may safely exit the swimming pool by climbing up said stationary ramp.

The traction means preferably comprises a series of raised ridges on the upper surface of the sloping ramp portion. The means of supporting the first end of the ramp may include: a) at least one leg that engages the bottom of the pool; b) buoyancy means extending into the water. In the first embodiment, there are preferably two legs that engage the bottom of the pool and the length of the legs is adjustable to accommodate various pool depths. The means to prevent the generally horizontal platform from moving vertically and horizontally relative to the edge portion of the swimming pool preferably comprises means to fixedly fasten a second end of the generally horizontal platform to the edge portion of the swimming pool. Alternatively, the means to prevent the generally horizontal platform from moving vertically and horizontally relative to the edge portion of the swimming pool comprises a second sloping ramp portion extending downwardly from a second opposite edge of said generally horizontal platform, the second sloping ramp portion having leg means for engaging a ground portion external to said swimming pool. The means to prevent the generally horizontal platform from moving vertically and horizontally relative to the edge portion of the swimming pool most preferably includes an adjustable attachment means for accommodating a variety of pool configurations.

Various other features, advantages and characteristics of the present invention will become apparent after a reading of the following specification.

BRIEF DESCRIPTION OF THE DRAWINGS

The preferred embodiment(s) of the present invention are set forth in the drawings, like items bearing like reference numerals and in which.

DETAILED DESCRIPTION OF THE PREFERRED EMBODIMENT(S)

Figure 1:
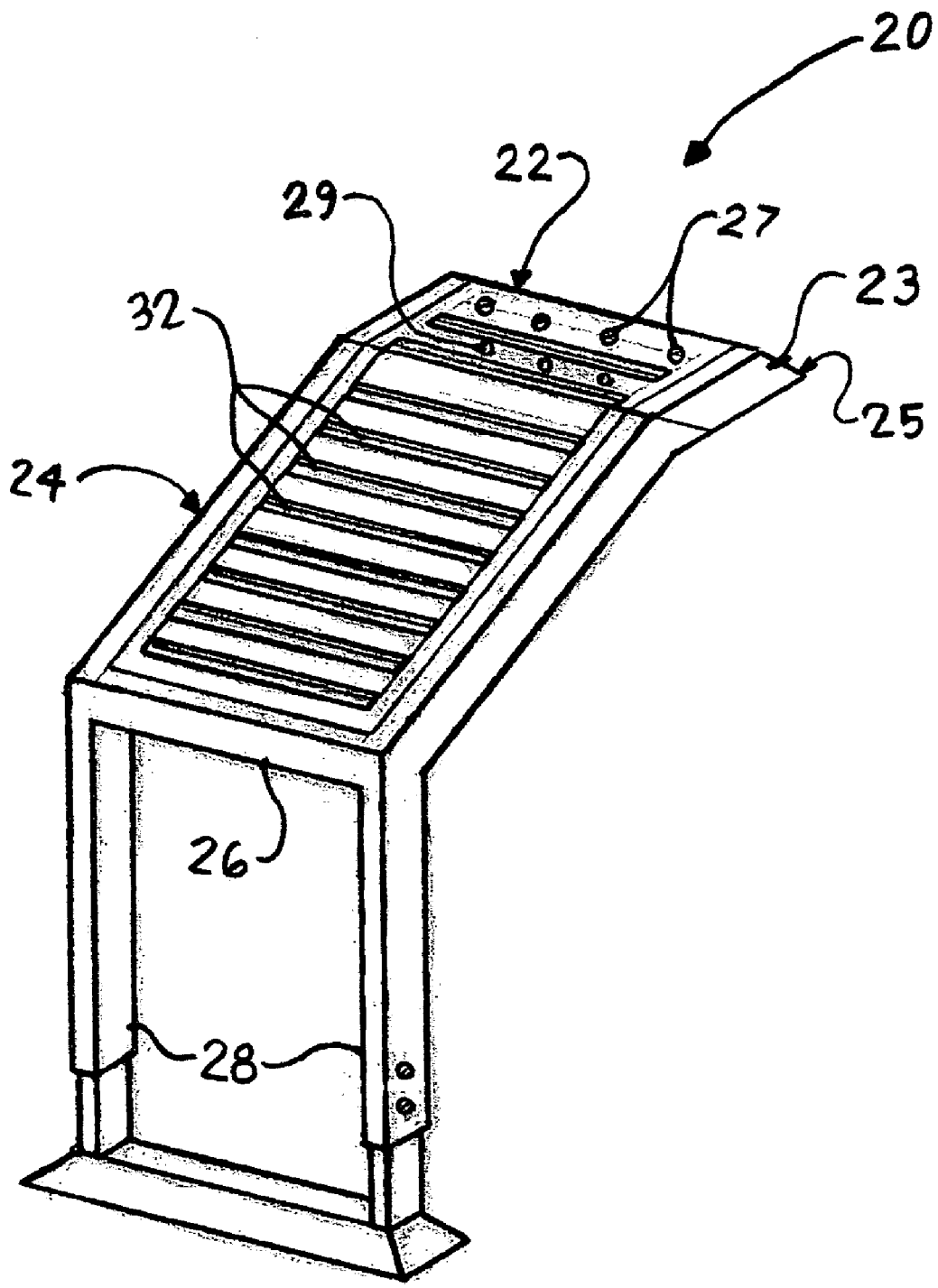
FIG. 1 is perspective view of a first embodiment of the pet ramp of the present invention.
Figure 2:
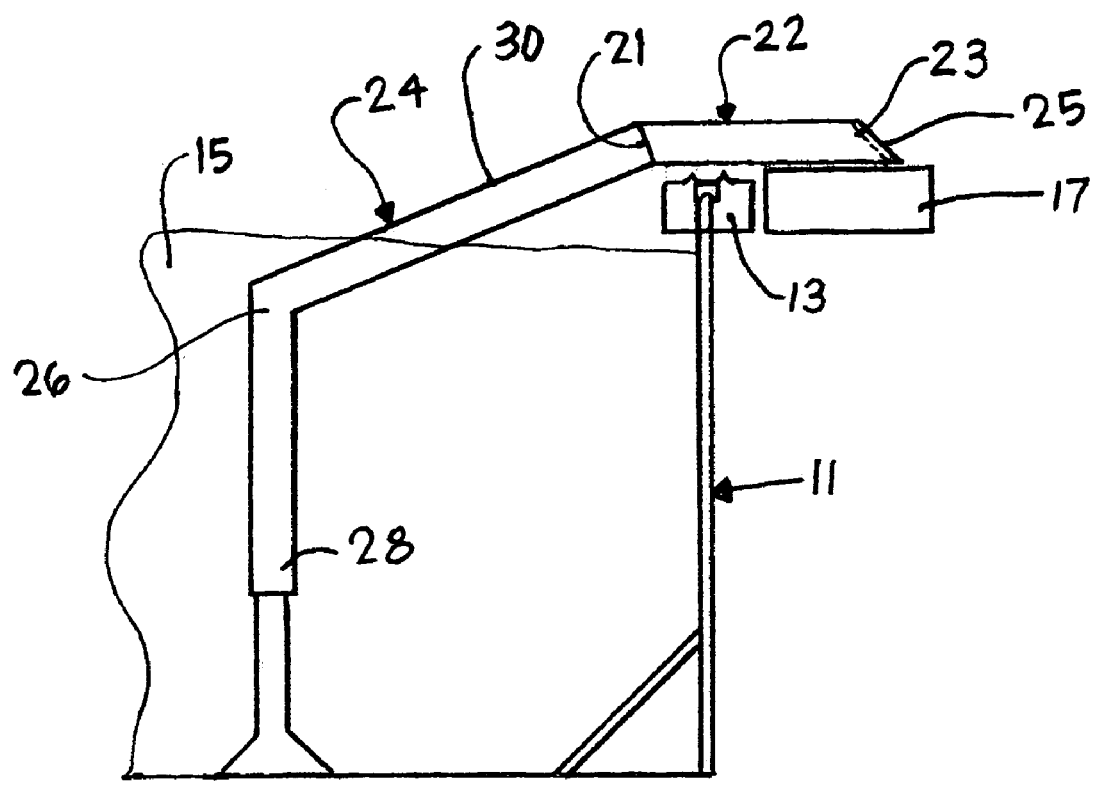
FIG. 2 is a side view of the first embodiment in place relative to the side of a pool.

A first embodiment of the pet ramp of the present invention is shown in FIGS. 1 and 2 genrally at 20. Pet ramp 20 includes a horizontal platform 22 that, in use, overlies a portion of the edge 13 of pool 11, a sloping ramp 24 attached to a first end 21 of horizontal platform 22 for extending down into the water 15 of the swimming pool 11 and means to support a first end 26 or ramp 24 in the pool, in this embodiment, a pair of legs 28. Legs 28 are adjustable in height in order to accommodate different pool depths. In addition, the length of platform 22 can be adjusted to accommodate different configurations of decks or alternate pool environments via telescoping section 23. Self-drilling, self-tapping screws can be inserted through holes 29 in telescoping section 23 and anchored into the internal section to position the section 23 at an appropriate location for a particular configuration of pool 11 and decking 17.

Upper surface 30 of sloping ramp 24 has traction means 32 formed thereon, in this embodiment, a series of raised ridges, which enable the pet to be able to climb out of the pool without slipping. The pet ramp 20 is provided with means to prevent the generally horizontal platform 22 from moving vertically and horizontally relative to the edge portion 13 of the swimming pool 11. In the first embodiment, this means comprises threaded anchors (screws or bolts) which can be installed through holes 27 adjacent second end 25 to anchor that end of horizontal platform 22 to decking 17. Pet ramp 20 may be made of high durability plastic, aluminum, or steel. If ramp 20 is made of a metal, the outer surface can be treated (painted, anodized, chromed, etc.) to protect it from corrosion from the pool water.

Figure 3:
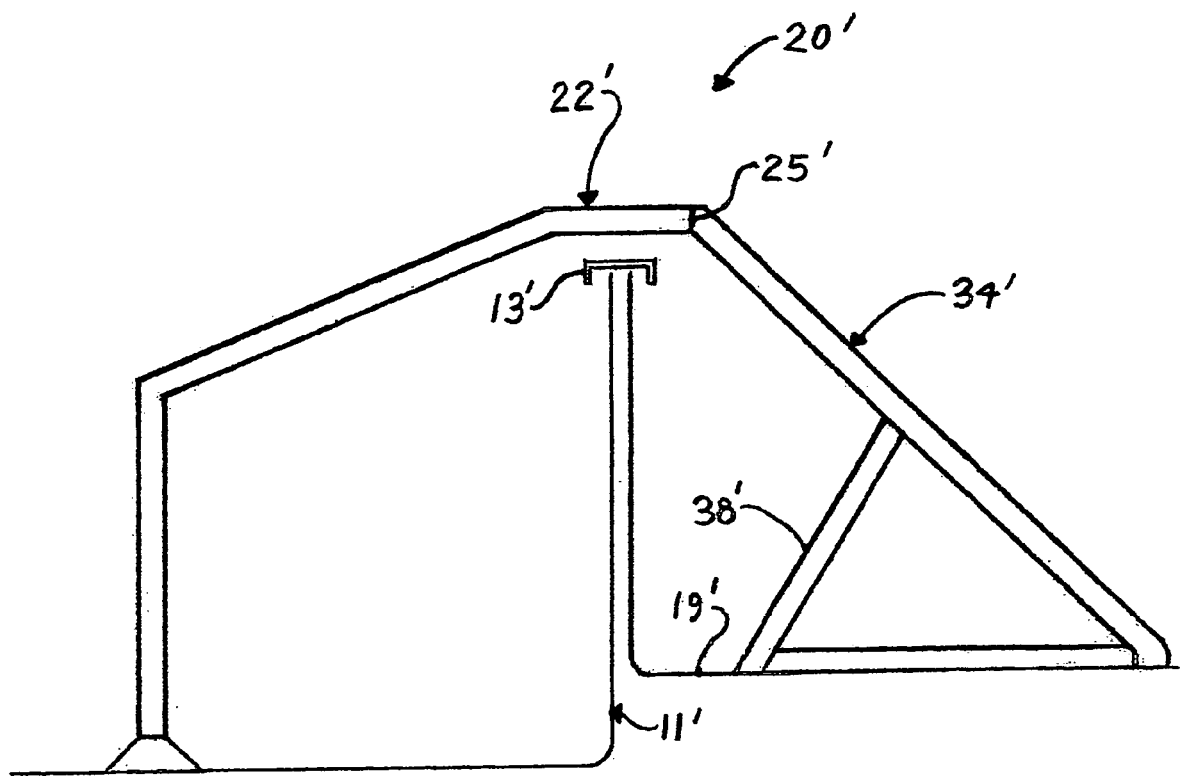
FIG. 3 is a side view of a second embodiment of the pet ramp of the present invention; and, FIG. 4 is a side view of a third embodiment of the pet ramp of the present invention.

A second embodiment is shown in FIG. 3 generally at 20'. In this second embodiment, the means to prevent platform 22' from moving relative to the upper edge portion 13' of pool 11' comprises a second sloping ramp portion 34' extending downwardly from a second opposite end 25' of said generally horizontal platform 22', the second sloping ramp portion 34' having leg means 38' for engaging a ground portion 19' external to said swimming pool 11'. Obviously, the connection between the second end 25' of horizontal platform 22' and second sloping ramp portion 34' can be adjustable to enable accommodation of different pool wall thicknesses and decking arrangements.

Figure 4:
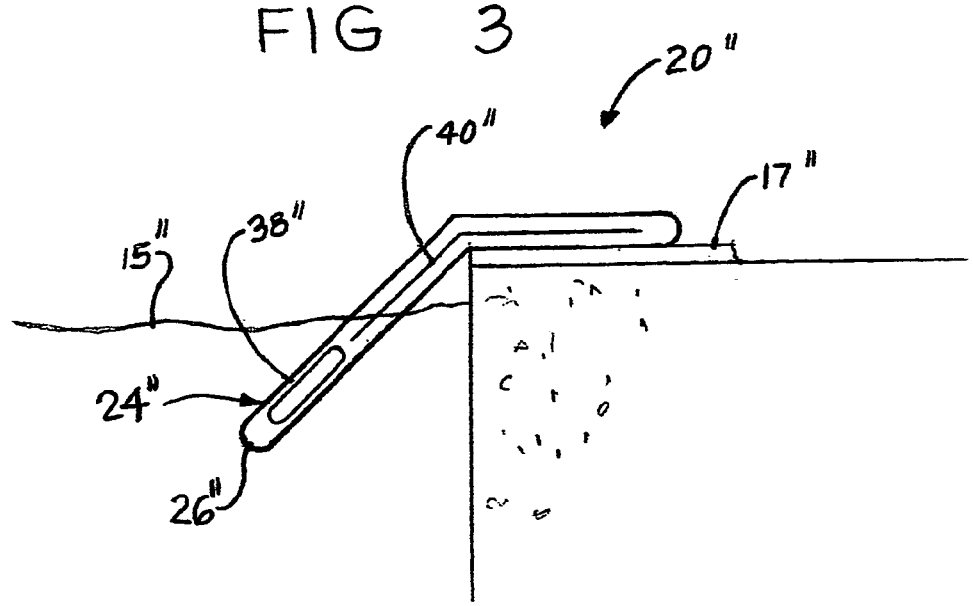

A third embodiment of the pet ramp of the present invention is depicted in FIG. 4 generally at 20". In this embodiment, ramp 20" is cantilevered from its connection to the decking 17" and the means in the water 15" to support a first end 26" of the sloping ramp portion 24" comprises buoyancy means 38" incorporated into sloping ramp portion 24". Buoyancy means 38" may comprise a pocket of entrapped air within the plastic molded pet ramp 20" or, alternatively, polystyrene encapsulated within the ramp 20". This embodiment further incorporates a metal plate 40" to reinforce the plastic pet ramp 20" to prevent collapse of the ramp at the bend under the weight of a large animal.

Various changes, alternatives and modifications will become apparent after a reading of the foregoing specification. It is intended that all such changes, alternatives and modifications as fall within the scope of the appended claims be considered part of the present invention.

I claim:

1. A stationary ramp for permitting a pet to exit a swimming pool which contains water, said stationary ramp comprising
   a) a horizontal platform overlying a portion of an edge of the swimming pool;
   b) a sloping ramp portion attached to a first end of said generally horizontal platform for extending down into the water in the swimming pool;
   c) traction means on said sloping ramp portion to enhance a pet's ability to walk on an upper surface of said sloping ramp portion;
   d) means in the water providing a vertically upward force to support a first end of said sloping ramp portion;
   e) means to prevent said generally horizontal platform from moving vertically and horizontally relative to the edge portion of the swimming pool;
   f) a second end lying immediately proximate the edge of the swimming pool;
   g) said means to prevent said generally horizontal platform from moving vertically and horizontally relative to the edge portion of the swimming pool comprises a second sloping ramp portion extending downwardly from a second opposite edge of said generally horizontal platform, said second sloping ramp portion having leg means for engaging a ground portion external to said swimming pool;
   whereby a pet may safely exit the swimming pool by climbing up said stationary ramp.

2. The pet ramp of claim 1 wherein said sloping ramp portion is made of rigid material and said traction means comprises a series of raised ridges on said upper surface of said sloping ramp portion.

3. The pet ramp of claim 1 wherein said means to provide an upward force to support said sloping ramp portion comprises at least one leg which engages a bottom of said swimming pool.

4. The pet ramp of claim 3 wherein said means to provide an upward force to support said said sloping ramp portion comprises at least two legs which each engage the bottom of said swimming pool.

5. The pet ramp of claim 4 wherein said at least two legs are adjustable in length to accommodate different depths of pools.

6. The pet ramp of claim 1 wherein said means to prevent said generally horizontal platform from moving vertically and horizontally relative to the edge portion of the swimming pool comprises an adjustable means accommodating a variety of pool configurations.

* * * * *